US010889033B2

(12) United States Patent
Miyashita et al.

(10) Patent No.: US 10,889,033 B2
(45) Date of Patent: Jan. 12, 2021

(54) SHEET-LIKE MEMBER FORMING METHOD AND APPARATUS

(71) Applicant: HONDA MOTOR CO., LTD., Tokyo (JP)

(72) Inventors: Keita Miyashita, Tochigi (JP); Hideki Shigematsu, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 239 days.

(21) Appl. No.: 15/658,552

(22) Filed: Jul. 25, 2017

(65) Prior Publication Data

US 2018/0036920 A1    Feb. 8, 2018

(30) Foreign Application Priority Data

Aug. 8, 2016  (JP) .................................. 2016-155711

(51) Int. Cl.
*H02K 15/10*    (2006.01)
*B29C 43/22*    (2006.01)
(Continued)

(52) U.S. Cl.
CPC ............ *B29C 43/224* (2013.01); *B29C 43/26* (2013.01); *B29C 43/361* (2013.01);
(Continued)

(58) Field of Classification Search
CPC ......... B29C 53/04; B29C 53/46; B29C 53/42; H02K 15/10; B31F 1/0051; B31F 1/0077
See application file for complete search history.

(56) References Cited

U.S. PATENT DOCUMENTS 1,693,630 A * 12/1928 Wermine ................ B29C 53/14
                                                             138/124
2,340,291 A *  2/1944 Wirtz ..................... H02K 15/10
                                                             29/33 L
(Continued)

FOREIGN PATENT DOCUMENTS

JP    H07-117146    5/1995
JP    07-156262     6/1995
(Continued)

OTHER PUBLICATIONS

Machine translation of JP2013102568 (Year: 2013).*
Japanese Office Action dated Jun. 28, 2019, 23 pages.
Japanese Office Action dated Feb. 27, 2018, 3 pages.

*Primary Examiner* — Timothy Kennedy
*Assistant Examiner* — Alexander A Wang
(74) *Attorney, Agent, or Firm* — Rankin, Hill & Clark LLP

(57) ABSTRACT

An insulating sheet is pushed into a first mold portion, and formed in a first shape along a shape of the first mold portion. The insulating sheet of the first shape inside the first mold portion is pushed into the second mold, and is deformed by a front mold portion, a front guide portion, and a bent convex portion of the front mold, and a rear mold portion and a rear guide portion of the rear mold, and is formed in a second shape. The insulating sheet of the second shape is inclined such that the front end portion overlaps the rear end portion in a first direction, and the width in a front-rear direction becomes narrower toward the front and the rear end portions. The insulating sheet inserted in the second mold and formed in the second shape is inserted into a slot of a stator core.

4 Claims, 9 Drawing Sheets

(51) Int. Cl.
*B31F 1/00* (2006.01)
*B29C 43/26* (2006.01)
*B29C 43/36* (2006.01)
*B29C 53/04* (2006.01)
*B29L 31/34* (2006.01)
*B29L 31/00* (2006.01)
*H02K 15/02* (2006.01)

(52) U.S. Cl.
CPC .......... *B31F 1/0051* (2013.01); *B31F 1/0077* (2013.01); *H02K 15/10* (2013.01); *B29C 53/04* (2013.01); *B29K 2995/0007* (2013.01); *B29L 2031/3412* (2013.01); *B29L 2031/749* (2013.01); *H02K 15/02* (2013.01)

(56) References Cited

U.S. PATENT DOCUMENTS 3,952,676 A * 4/1976 Rockefeller ........... B21D 51/36
 413/1
5,882,752 A * 3/1999 Yoneda ................ B01D 63/021
 428/141

FOREIGN PATENT DOCUMENTS

| | | | |
|---|---|---|---|
| JP | 2011-182596 | | 9/2011 |
| JP | 2013102568 | * | 5/2013 |
| JP | 2013-121297 | | 6/2013 |
| JP | 2013-162562 | | 8/2013 |
| JP | 2014-135865 | | 7/2014 |

\* cited by examiner

SHEET-LIKE MEMBER FORMING METHOD AND APPARATUS

BACKGROUND OF THE INVENTION

Field of the Invention

The present invention relates to a sheet-like member forming method and apparatus deforming a sheet-like member into a predetermined shape.

Description of the Related Art

A rotary electric machine stator includes an insulating sheet interposed between each coil phases to ensure insulation between different phase coils. This kind of insulating sheet includes a pair of insulating plate portions and a pair of connecting leg portions integrally connecting the two insulating plate portions. The insulating plate portion is formed in a plate shape having a relatively large area. The two connecting leg portions are formed in an elongated band shape and extend in parallel to each other from a side end portion of each insulating plate portion (for example, see Japanese Patent Laid-Open No. 2013-121297).

According to Japanese Patent Laid-Open No. 2013-121297, one of the insulating plate portions is interposed between the phases of coil ends projecting from one end in an axial direction of a stator core to insulate each phase. The other of the insulating plate portions is interposed between the phases of coil ends projecting from the other end in the axial direction of the stator core to insulate each phase. Then, the connecting leg portions connecting the two insulating plate portions are inserted into stator core slots provided to windingly support the coils.

According to Japanese Patent Laid-Open No. 2013-121297, a fold is formed in the connecting leg portion and the insulating plate portion, and an insulating sheet is deformed along the fold into a predetermined shape. Thus, the number of steps increases and the process time also increases by having the step of forming the fold.

SUMMARY OF THE INVENTION

The present invention has been made in view of the above circumstances, and an object of the present invention is to provide a sheet-like member forming method and apparatus capable of forming a sheet-like member into a predetermined shape without increasing the number of steps.

The sheet-like member forming method of the present invention is a sheet-like member forming method of deforming a sheet-like member into a predetermined shape, the method comprising: a first step of pushing the sheet-like member into a first mold portion formed in a concave shape in a first direction of a first mold, in the first direction by a first pushing member, to be formed in a first shape along a shape of the first mold portion; and a second step of pushing the sheet-like member of the first shape, in a state of being pushed in the first mold portion, into a second mold portion penetrating in a second direction different from the first direction of the second mold, in the second direction by a second pushing member, to be formed in the predetermined shape along a shape of the second mold portion.

According to the sheet-like member forming method of the present invention, the sheet-like member is pushed into the first mold portion of the first mold to be formed in a first shape, and the sheet-like member of the first shape in the state of being pushed in the first mold portion is pushed into the second mold portion of the second mold to be formed in the predetermined shape. Thus, the insulating sheet can be formed into the predetermined shape without forming a fold in the insulating sheet. Therefore, the number of steps can be reduced in comparison with a method of having a step of forming a fold.

Further, preferably, the second mold portion is formed to be inclined so that the width becomes narrower from an upstream side to a downstream side in a pushing direction of the sheet-like member, and in the second step, the sheet-like member is formed in the predetermined shape along a shape of a downstream side end portion of the second mold portion.

This configuration allows the second mold portion to be inclined so that the width becomes narrower from the upstream side to the downstream side in the pushing direction of the sheet-like member. Thus, the sheet-like member can be formed in a predetermined shape having a width narrower than the first shape by pushing the sheet-like member along the inclined surface formed in the second mold portion without applying a large force to the sheet-like member.

Further, preferably, the second mold portion includes a guide portion formed to guide one end portion of the sheet-like member toward outside of the other end portion thereof so that the one end portion overlaps the other end portion in the first direction, and in the second step, the sheet-like member is deformed along a shape of the guide portion and is formed in the predetermined shape in which the one end portion overlaps the other end portion.

This configuration can easily form the sheet-like member into a predetermined shape in which the one end portion to overlap the other end portion.

The sheet-like member forming apparatus of the present invention is a sheet-like member forming apparatus deforming a sheet-like member into a predetermined shape, the apparatus comprising: a first mold including a first mold portion formed in a concave shape in a first direction and forming the sheet-like member into a first shape along a shape of the first mold portion; a first pushing member configured to push the sheet-like member into the first mold portion in the first direction, to be formed in the first shape; a second mold including a second mold portion penetrating in a second direction different from the first direction, and forming the sheet-like member of the first shape into the predetermined shape along a shape of the second mold portion, and a second pushing member pushing the sheet-like member of the first shape in a state of being pushed in the first mold portion into the second mold, in the second direction to be formed in the predetermined shape, wherein the second mold portion is formed to be inclined so that a width becomes narrower from an upstream side to a downstream side in a pushing direction of the sheet-like member.

According to the sheet-like member forming apparatus of the present invention, the sheet-like member is pushed into the first mold portion of the first mold thereby to be formed in the first shape, and the sheet-like member of the first shape in the state of being pushed in the first mold portion is pushed into the second mold portion of the second mold thereby to be formed in the predetermined shape. Thus, the insulating sheet can be formed into the predetermined shape without forming a fold in the insulating sheet.

Therefore, the number of steps can be reduced in comparison with a method of having a step of forming a fold. Further, the second mold portion is formed to be inclined so that the width becomes narrower from the upstream side to the downstream side in the pushing direction of the sheet-like member. Thus, the sheet-like member can be formed in a predetermined shape having a width narrower than the first shape by pushing the sheet-like member along the inclined surface formed in the second mold portion without applying a large force to the sheet-like member.

Further, preferably, the second mold portion includes a guide portion formed to guide one end portion of the sheet-like member toward outside of the other end portion thereof so that the one end portion overlaps the other end portion in the first direction.

This configuration can easily form the sheet-like member into a predetermined shape in which the one end portion to overlap the other end portion by the guide portion of the second mold portion.

The present invention can form the sheet-like member into a predetermined shape without increasing the number of steps.

DETAILED DESCRIPTION OF THE PREFERRED EMBODIMENTS

Hereinafter, embodiments of the present invention will be described with reference to the accompanying drawings.

Figure 1:
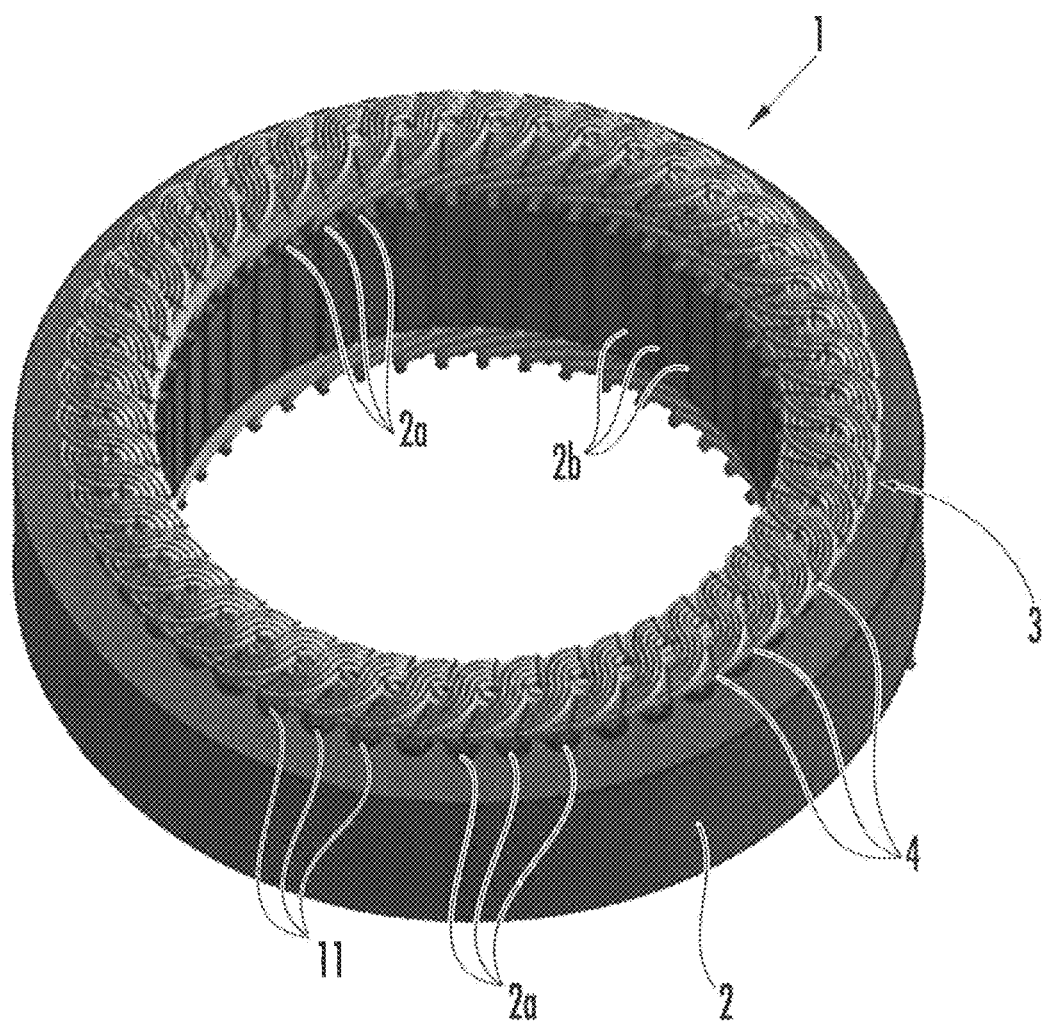
FIG. 1 is a perspective view illustrating a stator into which insulating sheets formed by a forming apparatus of the present invention are inserted.
Figure 2:
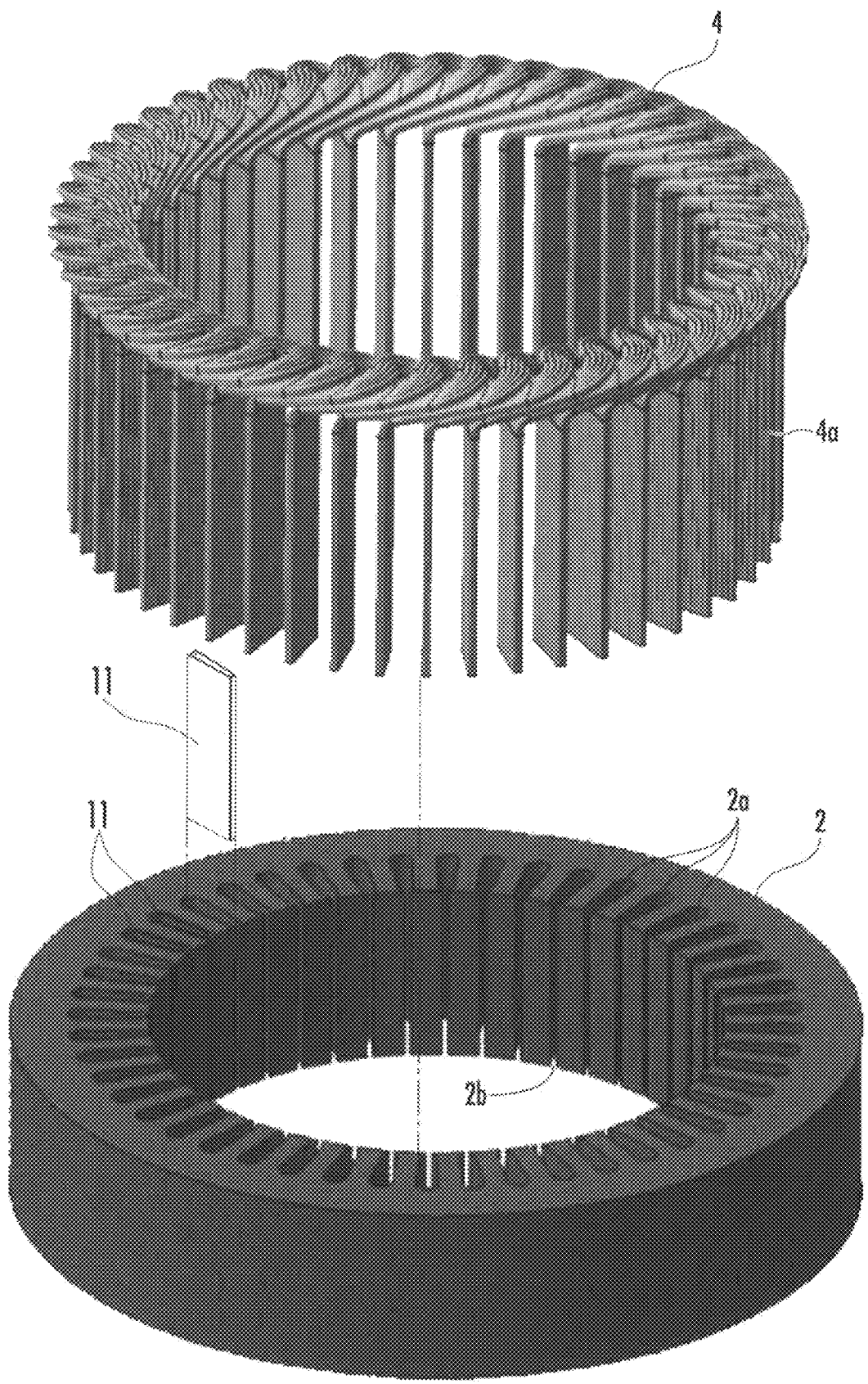
FIG. 2 is an exploded perspective view illustrating a stator core, coil segments and insulating sheets.

As illustrated in FIGS. 1 and 2, a rotary electric machine (not illustrated) such as an electric motor and a generator includes a stator 1 formed in a cylindrical shape and a rotor (not illustrated) rotatably disposed inside the stator 1.

The stator 1 includes a stator core 2 and a coil 3. The stator core 2 has a cylindrical shape, and a plurality of slots 2a penetrating in a direction of a rotating shaft are provided spaced apart from each other in a circumferential direction. Each slot 2a is formed so that a radial direction sectional shape of the stator core 2 radially extends from a center side of the stator core 2 in a radial direction, and communicates with an inner peripheral surface of the stator core 2 through a slit 2b formed in the stator core 2. Note that the slit 2b may be omitted.

The coil 3 is formed so that a leg portion 4a of a coil segment 4 is inserted into a slot 2a from one side of the slot 2a, a projecting portion projecting from the other side of the slot 2a is twisted and bent in a circumferential direction, and then is welded.

Figure 3:
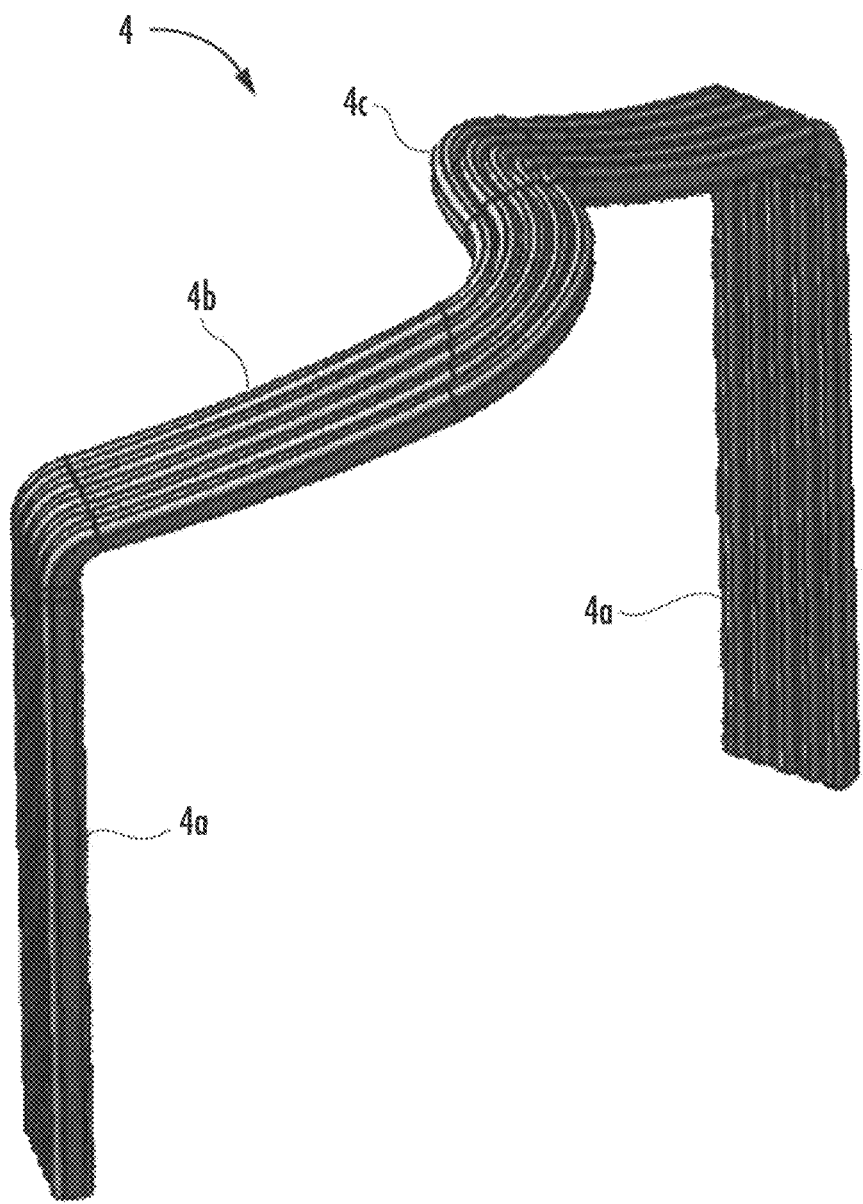
FIG. 3 is a perspective view illustrating a coil segment.

As illustrated in FIG. 3, the coil segment 4 is formed by arranging a plurality of conductors (rectangular wire conductors) having a rectangular cross section in a row such that the wider surfaces thereof face each other to form a single bundle in a U-shape. The coil segment 4 includes a pair of leg portions 4a and 4a and a head portion 4b connecting one end (upper end in FIG. 3) of the two leg portions 4a and 4a.

Note that the coil segment 4 may be a bundle formed by aligning a plurality of rectangular wires in the width direction. For example, the coil segment 4 may be formed by aligning a plurality of rectangular wires in a row such that the narrow sides thereof face each other.

The center of the head portion 4b includes an S-shaped portion 4c curved in an S shape in an alignment direction of the rectangular wire. The head portion 4b is inclined downward from the center (center of the S-shaped portion 4c) toward the two leg portions 4a and 4a. The leg portion 4a of the coil segment 4 is inserted into a corresponding slot 2a from one side thereof. The leg portion 4a of the coil segment 4 is projected from the other side of the slot 2a.

Note that the coil 3 of the present embodiment is a three-phase coil including a U phase, a V phase, and a W phase. The leg portion 4a of the coil segment 4 inserted into each slot 2a has a U phase, a U phase, a V phase, a V phase, a W phase, and a W phase arranged in that order in the circumferential direction.

As illustrated in FIG. 2, an insulating sheet 11 (sheet-like member) for ensuring insulation is inserted into each slot 2a of a stator core 2. This insulating sheet 11 is made of a hard paper material or a thin resin sheet material and is inserted along the shape of the slot 2a.

Now, the description will focus on an insulating sheet forming apparatus 20 (see FIG. 4) which forms the insulating sheet 11 into a shape along the shape of the slot 2a to be inserted thereinto.

Figure 4:
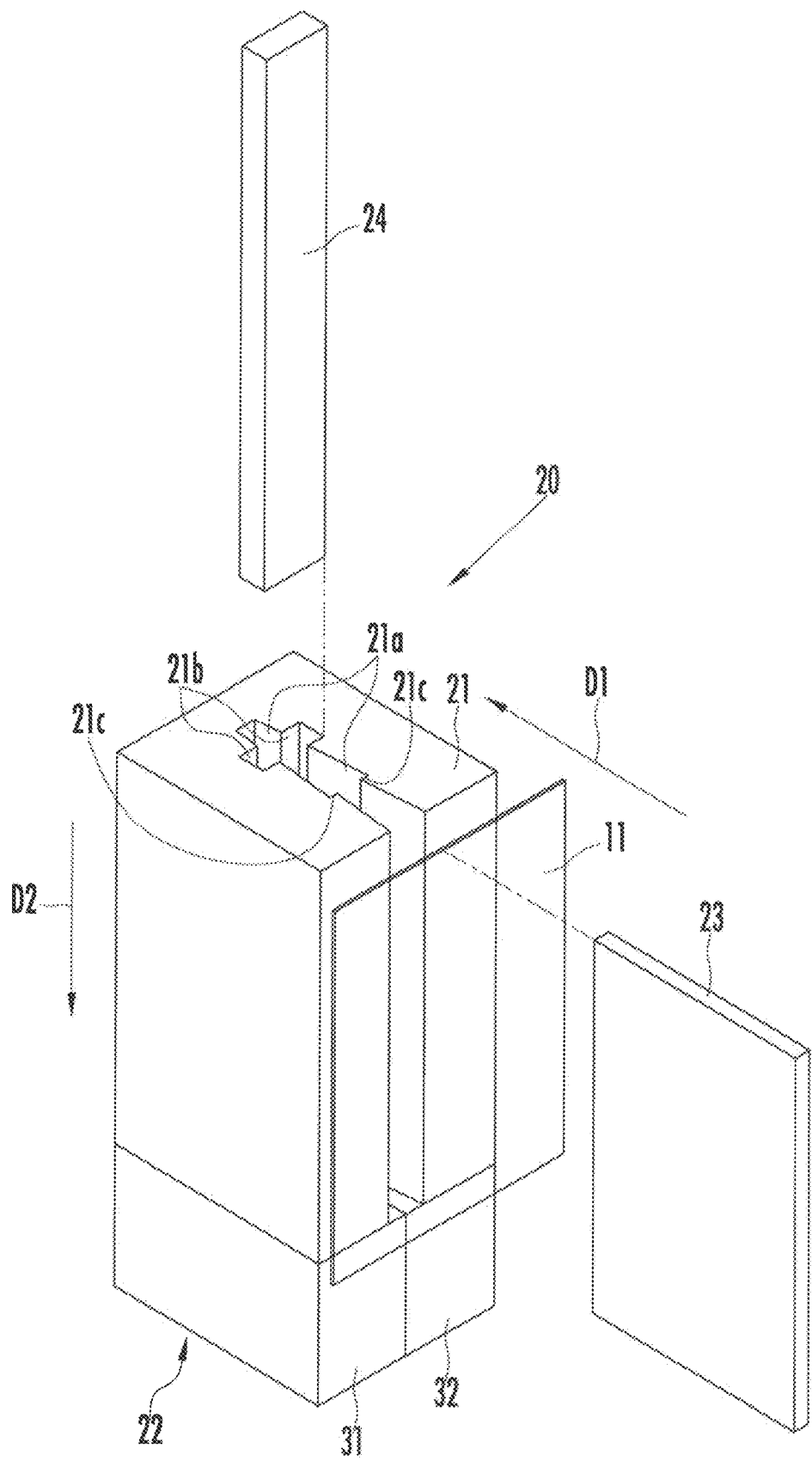
FIG. 4 is a perspective view illustrating the insulating sheet forming apparatus.

As illustrated in FIG. 4, the insulating sheet forming apparatus 20 includes a first mold 21, a second mold 22, a first pushing punch 23 (first pushing member), and a second pushing punch 24 (second pushing member). The insulating sheet forming apparatus 20 is placed above the stator core 2 (see FIG. 2) and used. Note that the insulating sheet 11 is illustrated as transparent in FIG. 4.

The first mold 21 includes a first mold portion 21a having a concave shape in a first direction D1 which is a left-right direction and formed penetrating in a second direction D2 which is an up-down direction, and a pushing hole 21b penetrating in the second direction D2 and allowing the second pushing punch 24 to be inserted thereinto. Note that it is sufficient that at least the lower end of the first mold portion 21a is open, and it is not necessary that the first mold portion 21a penetrates in the second direction D2. If the first mold portion 21a does not penetrate in the second direction D2, it is necessary that a gap is provided between an upper end of the first mold portion 21a and an upper end of the insulating sheet 11, and then the pushing punch is inserted through the gap.

The first mold portion 21a includes two stopper portions 21c contacting a front end portion 11a and a rear end portion 11b (see FIG. 9) of the insulating sheet 11 formed in a first shape to be described later, in order to prevent the insulating sheet 11 from coming out. Note that the stopper portion 21c may not be formed over the entire length in an up-down direction of the first mold portion 21a, but may be formed only in one portion such as the upper end and the lower end.

Figure 5:
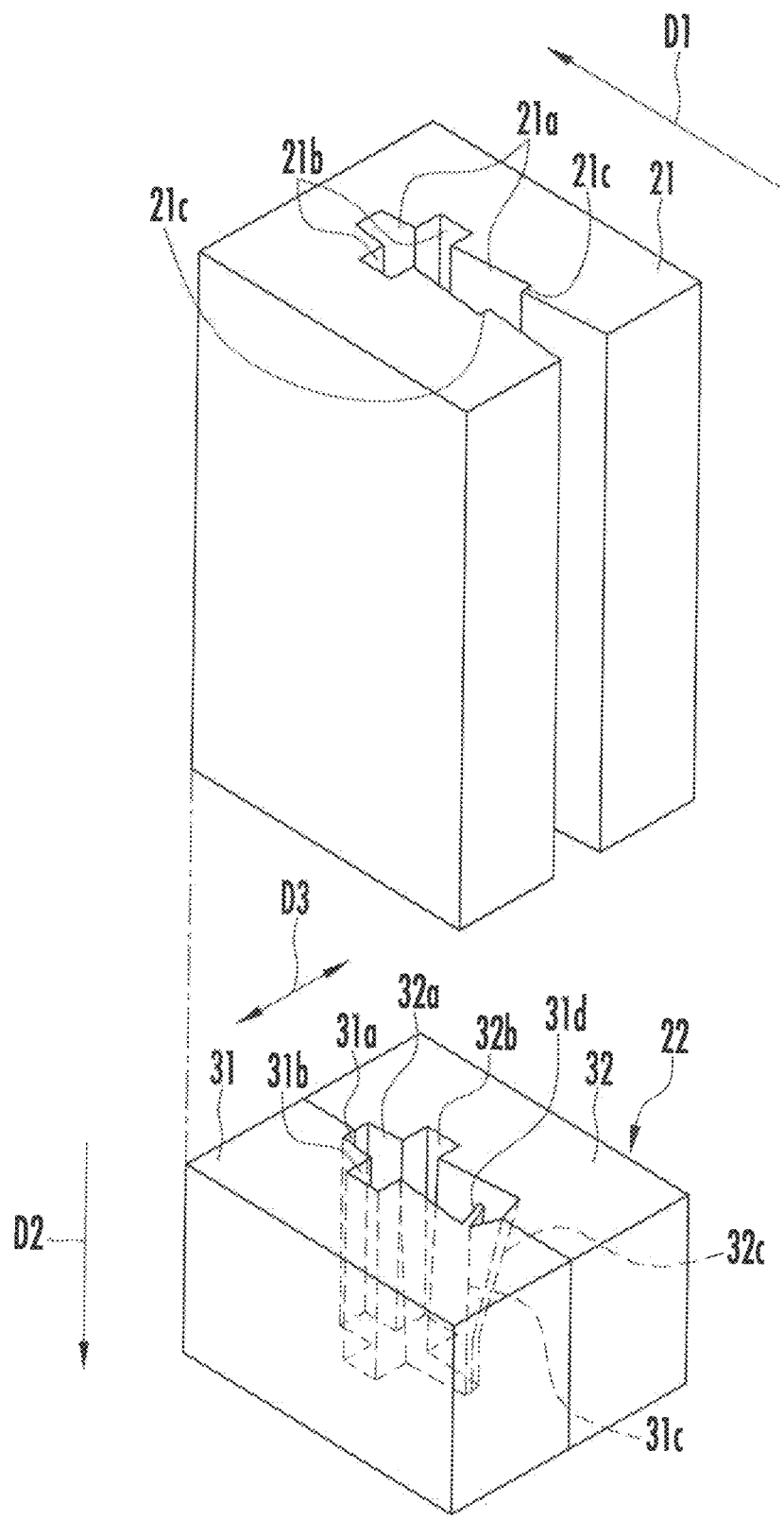
FIG. 5 is an exploded perspective view illustrating a first mold and a second mold.

As illustrated in FIG. 5, the second mold 22 includes a front mold 31 and a rear mold 32. The front mold 31 is fixed to the rear mold 32, for example, by bolts (not illustrated). Note that the front mold 31 and the rear mold 32 may be configured of one part.

Figure 6:
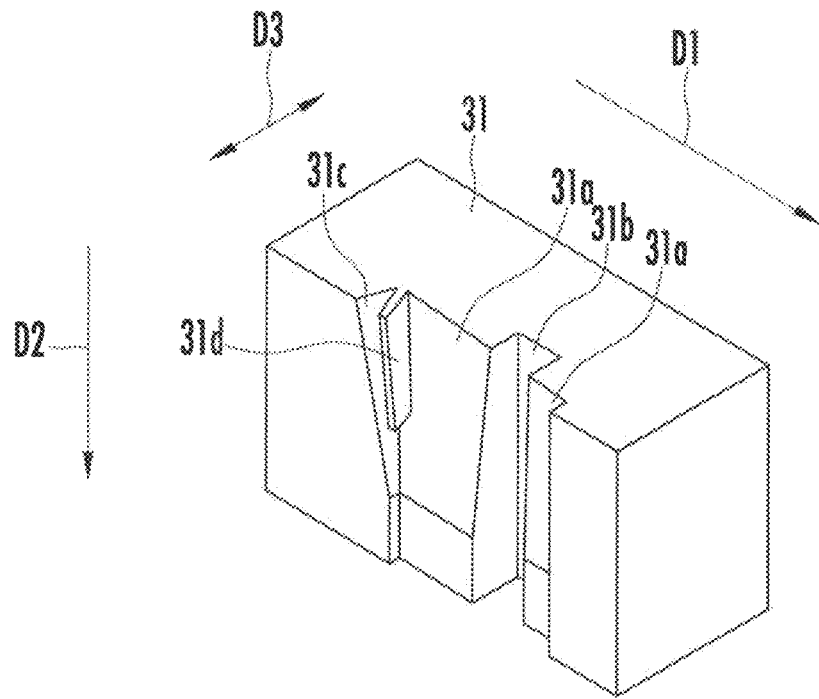
FIG. 6 is a perspective view illustrating a front mold of the second mold.

As illustrated in FIG. 6, the front mold 31 includes a front mold portion 31a formed penetrating in the second direction D2; and a front pushing concave portion 31b penetrating in the second direction D2 and allowing the second pushing punch 24 to be inserted thereinto.

The upper end of the front mold portion 31a has the same shape as the front half of the first mold portion 21a, and the front mold portion 31a is inclined so that the width in the front-rear direction D3 becomes narrower toward the lower end. The front mold portion 31a includes a front guide portion 31c formed in reducing the width in the first direction D1 of the front mold portion 31a toward the lower end and for bending the front end portion 11a (see FIG. 9) of the insulating sheet 11. The lower end of the front mold portion 31a is formed so that the width in the front-rear direction D3 becomes narrower from the end portion on an opposite side of the front guide portion 31c toward the front guide portion 31c. Note that the same shape includes a slightly different shape.

Figure 9:
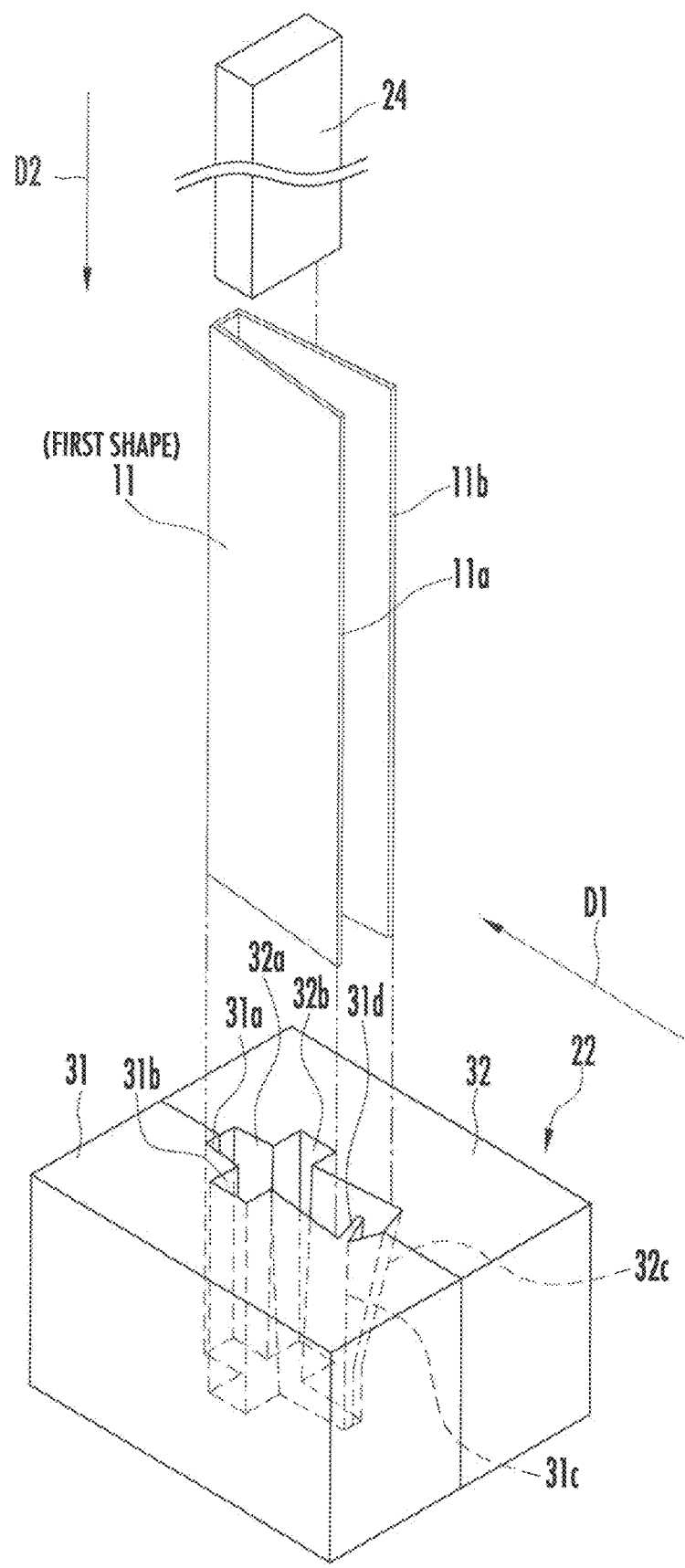
FIG. 9 is a perspective view illustrating an insulating sheet of a first shape, the second mold, and a second pushing punch.

In addition, a portion near the front guide portion 31c of the front mold portion 31a includes a bent convex portion 31d formed for bending the front end portion 11a so that the front end portion 11a of the insulating sheet 11 is located inside the rear end portion 11b (see FIG. 9). Note that the upper end of the front mold portion 31a includes a taper (not illustrated) formed to facilitate insertion of the insulating sheet 11 of the first shape to be described later into the front mold portion 31a. Note also that the portion of the bent convex portion 31d may be made of a member different from the front mold 31 and this different member may be fixed to the front mold 31.

Figure 7:
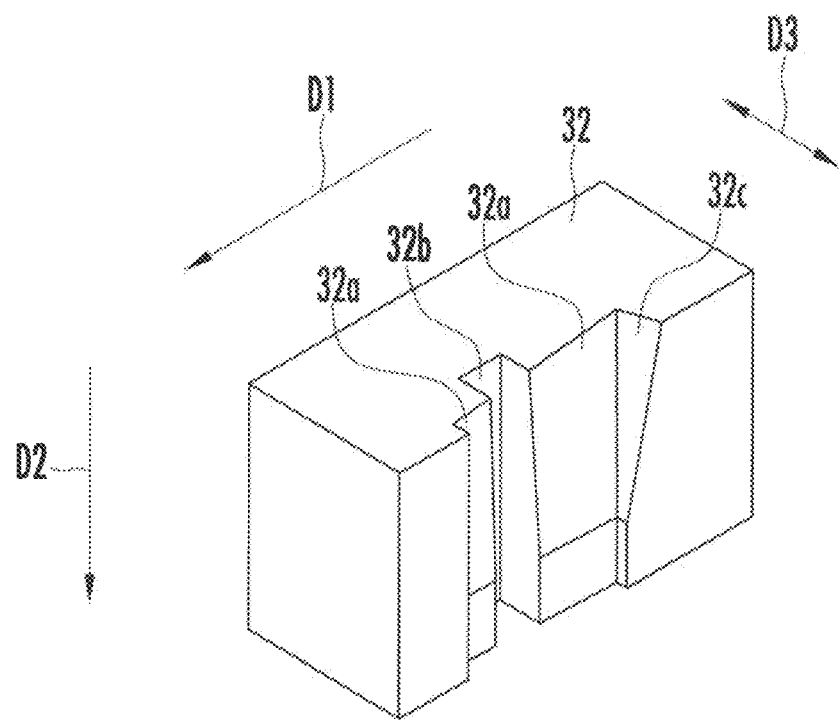
FIG. 7 is a perspective view illustrating a rear mold of the second mold.

As illustrated in FIG. 7, the rear mold 32 includes a rear mold portion 32a formed penetrating in the second direction D2; and a rear pushing concave portion 32b penetrating in the second direction D2 and allowing the second pushing punch 24 to be inserted thereinto. In the present embodiment, the second mold portion is constituted by the front mold portion 31a of the front mold 31 and the rear mold portion 32a of the rear mold 32.

The upper end of the rear mold portion 32a has the same shape as the rear half of the first mold portion 21a, and the rear mold portion 32a is inclined so that the width in the front-rear direction D3 becomes narrower toward the lower end. The rear mold portion 32a includes a rear guide portion 32c formed for use in reducing the width in the first direction D1 of the rear mold portion 32a toward the lower end and bending the rear end portion 11b of the insulating sheet 11.

The lower end of the rear mold portion 32a is formed so that the width in the front-rear direction D3 becomes narrower from the end portion on an opposite side of the rear guide portion 32c toward the rear guide portion 32c. Note that the upper end of the rear mold portion 32a includes a taper (not illustrated) formed to facilitate insertion of the insulating sheet 11 of the first shape to be described later into the rear mold portion 32a.

The second mold 22 is disposed such that the front mold portion 31a of the front mold 31 and the rear mold portion 32a of the rear mold 32 are positioned directly above the slot 2a of the stator core 2.

Now, the description will focus on an operation flow of forming the insulating sheet 11 into a predetermined shape to be inserted into the slot 2a of the stator core 2 using the insulating sheet forming apparatus 20.

Figure 8:
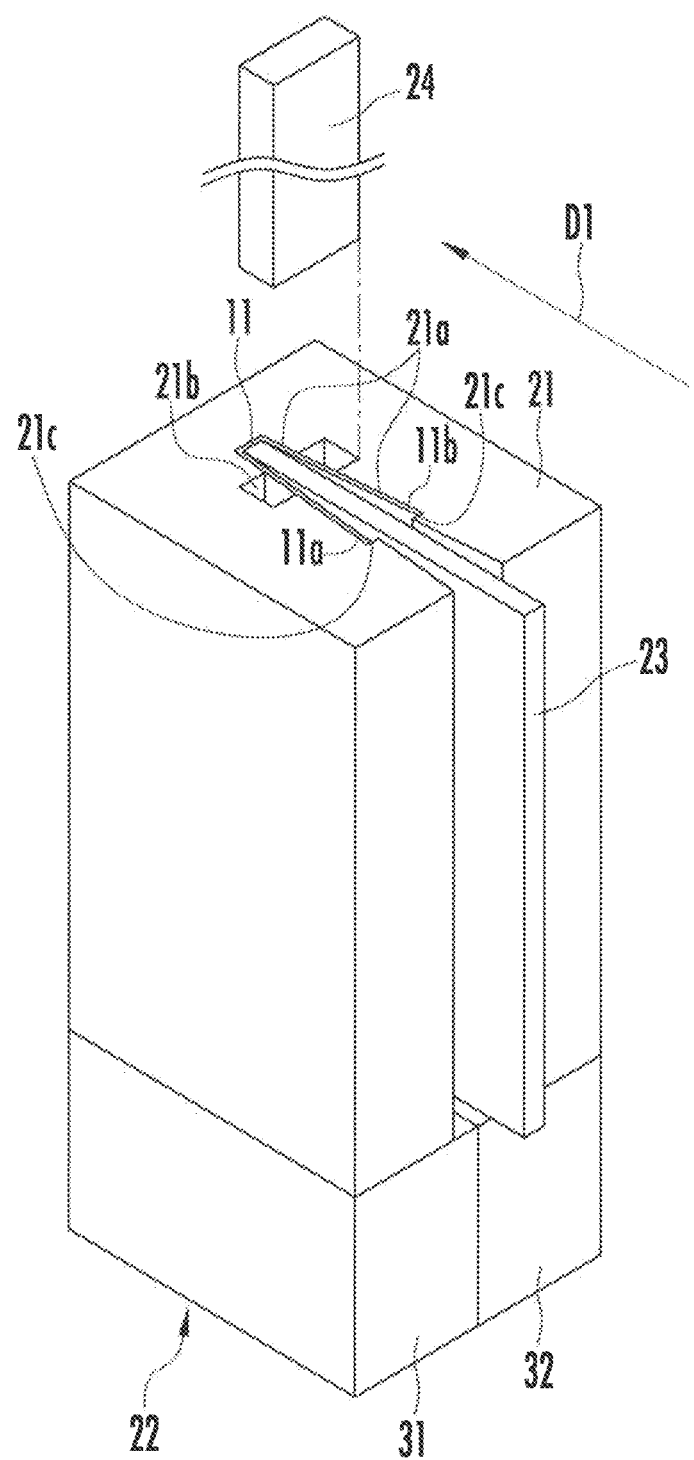
FIG. 8 is a perspective view illustrating the insulating sheet forming apparatus in a state in which an insulating sheet is pushed into the first mold.

First, as illustrated in FIG. 8, the first pushing punch 23 is moved in the first direction D1 by a moving mechanism (not illustrated). Then, a rectangular insulating sheet 11 is pushed into the first mold portion 21a by the first pushing punch 23. As a result of this pushing, the insulating sheet 11 is deformed into a first shape (see FIGS. 8 and 9) along the shape of the first mold portion 21a (first step). Then, the first pushing punch 23 is moved by the moving mechanism to be removed from the first mold portion 21a.

Even after the first pushing punch 23 is removed from the first mold portion 21a, the front end portion 11a and the rear end portion 11b of the insulating sheet 11 formed into the first shape contact the stopper portion 21c, which can prevent the insulating sheet 11 from coming out of the first mold portion 21a.

Then, as illustrated in FIG. 9, the second pushing punch 24 is moved downward by the moving mechanism (not illustrated). Then, the insulating sheet 11 of the first shape inside the first mold portion 21a is pushed into the second mold 22 by the second pushing punch 24. Then, the insulating sheet 11 is pushed into a space defined by the front mold portion 31a of the front mold 31 constituting the second mold 22 and the rear mold portion 32a of the rear mold 32 constituting the second mold 22. Note that FIG. 9 omits illustration of the first mold 21.

Figure 10:
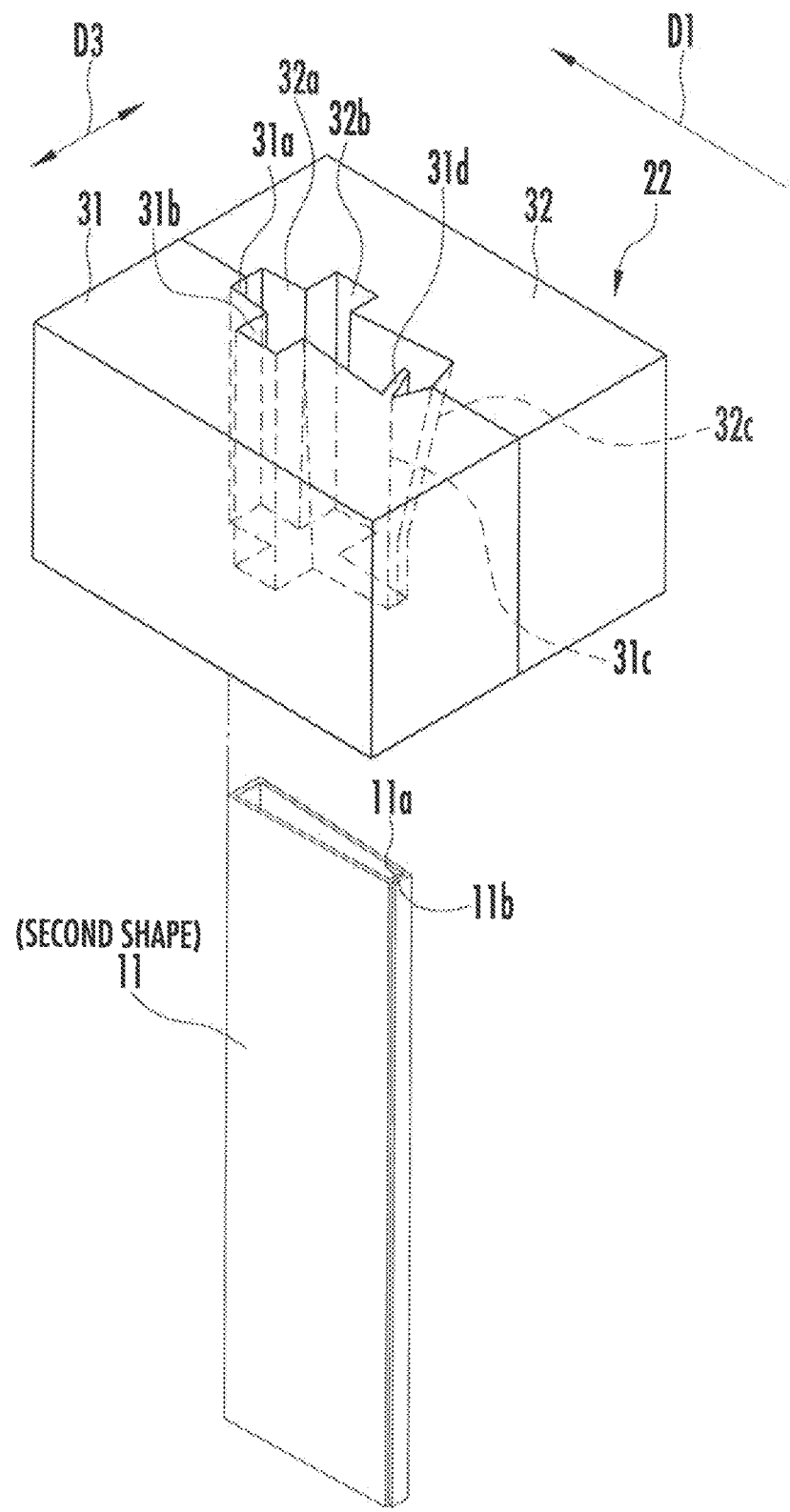
FIG. 10 is a perspective view illustrating an insulating sheet of a second shape and the second mold.

As a result of the above pushing, as illustrated in FIG. 10, the rear end portion 11b of the insulating sheet 11 is bent inward by the rear guide portion 32c of the rear mold 32. The front end portion 11a of the insulating sheet 11 is bent inward by the bent convex portion 31d of the front mold 31. As a result, the front end portion 11a and the rear end portion 11b of the insulating sheet 11 are formed into a second shape overlapping in the first direction D1 (second step). At the time of this formation, the front end portion 11a of the insulating sheet 11 is bent so as to be inside the rear end portion 11b by the bent convex portion 31d of the front mold 31.

As a result of the above pushing, the insulating sheet 11 is deformed into a shape along the front mold portion 31a of the front mold 31 and the rear mold portion 32a of the rear mold 32. The front mold portion 31a and the rear mold portion 32a are formed so that the width in the front-rear direction D3 becomes narrower toward the front guide portion 31c and the rear guide portion 32c. Thus, the insulating sheet 11 is inclined so that the width in the front-rear direction D3 becomes narrower toward the front end portion 11a and the rear end portion 11b and is formed into the second shape to be able to be inserted into the slot 2a of the stator core 2 and along the slot 2a. Note that FIG. 10 illustrates a state in which the insulating sheet 11 of the second shape is entirely pushed out of the second mold 22.

The insulating sheet forming apparatus 20 is disposed such that the front mold portion 31a and the rear mold portion 32a of the second mold 22 are positioned directly above the slot 2a of the stator core 2. When the second pushing punch 24 is further pushed, the insulating sheet 11 inserted into the second mold 22 and formed into the second shape is inserted into the slot 2a (see FIG. 2). When the second pushing punch 24 is pushed to reach the lower end of the second mold 22, the insulating sheet 11 formed into the second shape is entirely inserted into the slot 2a.

Then, the stator core 2 is rotated by a rotation mechanism (not illustrated) such that a slot 2a adjacent to the slot 2a having the insulating sheet 11 of the second shape inserted thereinto is positioned directly under the front mold portion 31a and the rear mold portion 32a of the second mold 22 and then the insulating sheet forming apparatus 20 is driven again to insert the insulating sheet 11 of the second shape into the slot 2a. When the above control is performed on every slot 2a, the insulating sheet 11 of the second shape is inserted into every slot 2a.

Then, the leg portion 4a of the coil segment 4 is inserted into an internal space defined by the insulating sheet 11 of the second shape inserted into the slot 2a (see FIG. 1). In this state, the leg portion 4a is covered with the insulating sheet 11, thus ensuring an insulation state.

As described above, the insulating sheet forming apparatus 20 of the present embodiment can form the insulating sheet 11 into the second shape (predetermined shape) without forming a fold in the insulating sheet 11. Therefore, the number of steps can be reduced in comparison with a method of having a step of forming a fold.

In the above-described embodiment, the present invention is applied to the apparatus forming the insulating sheet into the second shape (predetermined shape), but the present invention is not limited to forming the insulating sheet into the predetermined shape and the present invention is applicable to any apparatus forming various forms of sheet-like member such as wrapping paper into the predetermined shape.

In the above-described embodiment, the insulating sheet is formed into the second shape where the front end portion and the rear end portion of the insulating sheet are overlapped by the second mold, but the shape of the insulating sheet formed by the second mold may be any shape as long as the shape cannot be formed by the first mold. In other words, the second mold is provided for forming the insulating sheet into a shape that cannot be formed by the first mold, and thus it is not required to include the inclined surface whose width in the front-rear direction becomes narrower from the upper end toward the lower end, the guide portion, or the bent convex portion.

What is claimed is:

1. A sheet-like member forming method of deforming a sheet-like member into a predetermined shape, the method comprising:
   a first step of pushing the sheet-like member into a first mold portion formed in a concave shape in a first direction of a first mold, in the first direction by a first pushing member, to be formed in a first shape along a shape of the first mold portion; and
   a second step of pushing the sheet-like member of the first shape, in a state of being pushed in the first mold portion, into a second mold portion penetrating in a second direction different from the first direction of the second mold, in the second direction by a second pushing member so as to be pushed out from the first mold, to be formed in the predetermined shape along a shape of the second mold portion,
   wherein the second mold portion is formed to be inclined so that a width in a third direction becomes narrower from an upstream side to a downstream side in a pushing direction as the second direction of the sheet-like member, and in the second step, the sheet-like member is formed in the predetermined shape along a shape of a downstream side end portion of the second mold portion, and
   wherein the second mold portion includes a guide portion and a bent convex portion, the guide portion formed to be inclined to reduce a width in the first direction, and the bent convex portion formed to guide one end portion of the sheet-like member in the third direction toward outside of the other end portion thereof, the guide portion and the bent convex portion being formed so that the one end portion of the sheet-like member and the other end portion thereof are bent linearly in the third direction when being guided, and the one end portion overlaps the other end portion in the first direction and the third direction when the sheet-like member of the first shape in which the one end portion and the other end portion are linear and parallel, is pushed into the second mold in the second direction, and in the second step, the sheet-like member is deformed along a shape of the guide portion and is formed in the predetermined shape in which the one end portion overlaps the other end portion.

2. The sheet-like member forming method according to claim 1, wherein the second mold further includes a pushing concave portion penetrating the second mold in the second direction and communicating with the second mold portion, the pushing concave portion configured to receive the second pushing member in the second direction, and in the second step, the second pushing member is pushed into the pushing concave portion to push the sheet-like member of the first shape in the second direction so as to be pushed out from the first mold, to be formed in the predetermined shape along the shape of the second mold portion.

3. A sheet-like member forming apparatus deforming a sheet-like member into a predetermined shape, the apparatus comprising:
   a first mold including a first mold portion formed in a concave shape in a first direction and forming the sheet-like member into a first shape along a shape of the first mold portion;
   a first pushing member configured to push the sheet-like member into the first mold portion in the first direction, to be formed in the first shape;
   a second mold including a second mold portion penetrating in a second direction different from the first direction, and forming the sheet-like member of the first shape into the predetermined shape along a shape of the second mold portion; and
   a second pushing member pushing the sheet-like member of the first shape in a state of being pushed in the first mold portion into the second mold, in the second direction so as to be pushed out from the first mold portion, to be formed in the predetermined shape, wherein
   the second mold portion is formed to be inclined so that a width in a third direction becomes narrower from an upstream side to a downstream side in a pushing direction as the second direction of the sheet-like member, and
   the second mold portion includes a guide portion and a bent convex portion, the guide portion formed to be inclined to reduce a width in the first direction, and the bent convex portion formed to guide one end portion of the sheet-like member in the third direction toward outside of the other end portion thereof, the guide portion and the bent convex portion being formed so that the one end portion of the sheet-like member and the other end portion thereof are bent linearly in the third direction when being guided, and the one end portion overlaps the other end portion in the first direction and the third direction when the sheet-like member of the first shape in which the one end portion and the other end portion are linear and parallel, is pushed into the second mold in the second direction.

4. The sheet-like member forming apparatus according to claim 3, wherein the second mold further includes a pushing concave portion penetrating the second mold in the second direction and communicating with the second mold portion, the pushing concave portion configured to receive the second pushing member in the second direction.

\* \* \* \* \*